March 12, 1957      H. L. DEWAR      2,784,975
DRILL CHUCK
Filed May 5, 1955
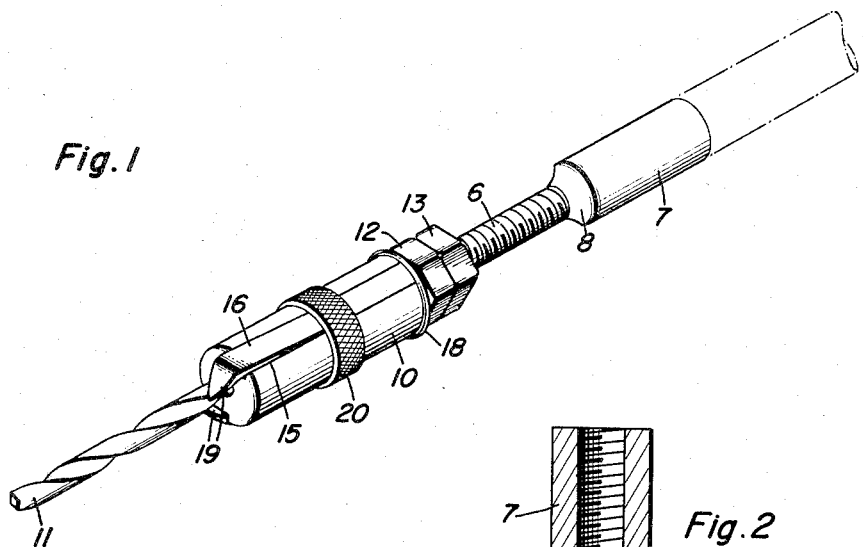
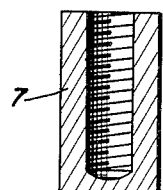
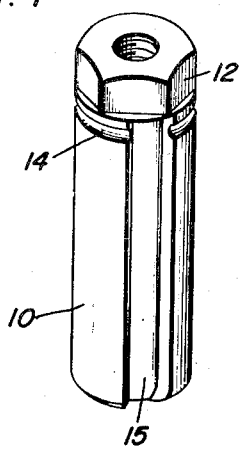
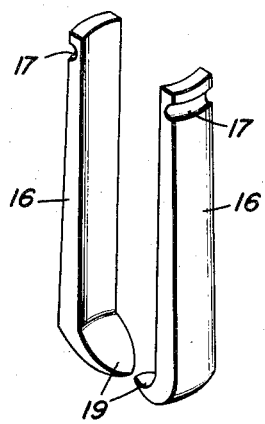
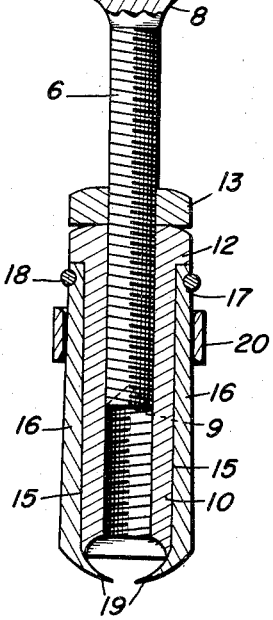
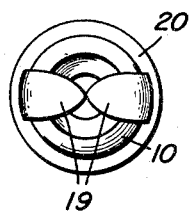
Harvey L. Dewar
INVENTOR.

United States Patent Office 2,784,975
Patented Mar. 12, 1957

2,784,975

DRILL CHUCK

Harvey L. Dewar, North Hollywood, Calif.

Application May 5, 1955, Serial No. 506,157

2 Claims. (Cl. 279—37)

The present invention relates to new and useful improve in drill chucks, and has for its primary object to provide, in a manner as hereinafter set forth, a device of this character comprising novel means for expeditiously and firmly securing drills of various sizes within a given range without resorting to threading or screwing.

Another very important object of the invention is to provide a chuck of the aforementioned character which will readily accept broken or shankless drills, thus avoiding considerable waste and expense.

Still another important object of the invention is to provide a chuck of the character described which may be longitudinally adjusted as desired for use with drills of different lengths.

Other objects of the invention are to provide an adjustable drill chuck of the character set forth which will be comparatively simple in construction, strong, durable, compact, light in weight, and which may be manufactured at low cost.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of a drill chuck embodying the present invention showing a drill in position in the device;

Figure 2 is a view in vertical section through the device;

Figure 3 is an end elevational view;

Figure 4 is a perspective view of the barrel; and

Figure 5 is a perspective view of the jaws.

Referring now to the drawing in detail, it will be seen that the embodiment of the invention which has been illustrated comprises a threaded shank 6 of suitable metal, which shank may be of any desired dimensions. On its upper end, the shank 6 is provided with an enlarged, internally threaded socket 7 providing a shoulder 8. The socket 7 is for the reception of a suitable driving tool. The lower end portion of the shank 6 is provided with a conical seat 9, the purpose of which will be presently set forth.

Threadedly mounted for longitudinal adjustment on the shank 6 is a metallic barrel 10. The barrel 10 is for the reception of a conventional fluted drill, as at 11. The barrel 10 terminates in an hexagonal upper end portion or head 12 for receiving a wrench. The barrel 10 is secured in adjusted position on the shank 6 by a lock nut 13 which is threaded on said shank and engageable with the upper end of said barrel.

Adjacent the head 12, the barrel 10 has formed therein a circumferential groove 14. The barrel 10 is further provided, in opposite sides, with longitudinal grooves or channels 15 which extend from the head 12 to the lower end of said barrel. The grooves or channels 15 interrupt the groove 14.

The channels 15 accommodate longitudinally tapered metallic fingers 16. The upper end portions of the fingers 16 have formed therein transverse grooves 17 which are aligned with the groove 15. The grooves 14 and 17 receive a resilient snap ring 18 for yieldingly securing the fingers 16 in position on the barrel 10.

The fingers 16 project beyond the lower end of the barrel 10 and terminate in substantially tapered, inwardly curved, opposed jaws 19 which are engageable in the flutes of the drill 11 for anchoring said drill in the barrel 10. Mounted for reciprocation on the barrel 10 is a manually operable roughened or knurled slip ring 20 for closing the jaws on the drill.

It is thought that the use of the tool will be readily apparent from a consideration of the foregoing. Briefly, the barrel 10 is threaded on the shank 6 and secured in adjusted position by the lock nut 13. The desired drill 11 is then inserted in the lower end portion of the barrel 10 and engaged in the conical seat 9 by which said drill is centered. The resilient ring 18 permits the jaws 19 to open or close to accommodate drills of various diameters. With the drill inserted in the barrel 10, the slip ring 20 is forced downwardly on the tapered fingers 16 for firmly closing the jaws 19 on said drill. The tool may now be used. The barrel 10 may be adjusted longitudinally for drills of different lengths by loosening the lock nut 13 and threading said barrel in either direction on the shank 6. Of course, the lock nut 13 is again tightened to secure the adjustment.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the appended claims.

What is claimed as new is as follows:

1. A drill chuck of the character described comprising; a barrel for the reception of a drill, said barrel having an external circumferential groove in one end portion thereof and further having longitudinal channels therein interrupting the groove, a pair of tapered fingers mounted in the channels, said fingers having external grooves therein aligned with the first-named groove, jaws at the outer ends of said fingers, a resilient ring disposed in the first- and second-named grooves for resiliently fastening the fingers on the barrel for swinging movement toward and away from each other, and a slip ring slidable on the barrel and engaged with the tapered fingers for closing the jaws on the drill.

2. A drill chuck of the character described comprising; a threaded shank, an internally threaded socket on one end of the shank, a barrel threadedly mounted for longitudinal adjustment on the shank and adapted to receive therein a drill, said shank having a conical seat in its other end for receiving and centering the drill, a lock nut threaded on the shank for securing the barrel in adjusted position, a pair of tapered fingers mounted longitudinally on the barrel, jaws on the fingers engageable with the drill, and means longitudinally slidable on said tapered fingers for closing said jaws on the drill.

References Cited in the file of this patent

UNITED STATES PATENTS

| 1,131,990 | Bocorselski | Mar. 16, 1915 |
| 1,994,975 | Williams | Mar. 19, 1935 |